United States Patent [19]
Weaver

[11] Patent Number: 5,604,645
[45] Date of Patent: Feb. 18, 1997

[54] MIRROR MOTOR MOUNTING BRACKET

[75] Inventor: James M. Weaver, Greenville, Ohio

[73] Assignee: United Technologies Automotive Systems, Dearborn, Mich.

[21] Appl. No.: 405,971

[22] Filed: Mar. 17, 1995

[51] Int. Cl.$^6$ ................................................. G02B 7/182
[52] U.S. Cl. ...................... 359/877; 248/27.3; 248/316.7
[58] Field of Search .......................... 359/877; 248/27.3, 248/313, 316.7, 488, 904

[56] References Cited

U.S. PATENT DOCUMENTS

| | | | |
|---|---|---|---|
| 3,193,613 | 7/1965 | Van Buren | 248/27.3 |
| 4,219,172 | 8/1980 | Murayama | 248/27.3 |
| 4,220,808 | 9/1980 | Fujita | 248/27.3 |
| 4,517,880 | 5/1985 | Buckne et al. | 248/27.3 |
| 4,687,164 | 8/1987 | Bakhavs et al. | 248/27.3 |
| 4,832,306 | 5/1989 | Bossack | 248/674 |
| 4,840,584 | 6/1989 | Cox | 248/27.3 |
| 4,981,279 | 1/1991 | Andreas et al. | 248/483 |
| 5,143,338 | 9/1992 | Eberlin | 248/313 |
| 5,219,135 | 6/1993 | Scott | 248/27.1 |
| 5,363,246 | 11/1994 | Perry et al. | 359/874 |

OTHER PUBLICATIONS

*Ultem Design Guide®*, GE Plastics, pp. 36–37.
*Valox®*, GE Plastics, pp. 54–57.
*General Design Principles*, Dupont, 104–107.
*Noryl® Design Guide*, GE Plastics, pp. 44–45.

*Primary Examiner*—Timothy P. Callahan
*Assistant Examiner*—Jeffrey Zweizig
*Attorney, Agent, or Firm*—Howard & Howard

[57] ABSTRACT

A mounting bracket for a mirror motor includes a plurality of elongate snapping fingers which are disposed at circumferentially spaced locations around an axis extending through the bracket. The elongate snapping fingers are designed such that a mirror motor can be releasably affixed to the mounting bracket. In one feature, the snapping fingers have a ratio of height to width of at least about 1.5:1. In another feature, the snapping fingers include a head portion having a top face and a bottom face. The top face slopes downwardly at a first angle and the bottom face slopes upwardly at an angle of at least about 10°. The first angle is greater than the second angle. In another feature, the mounting bracket includes at least one alignment structure mounted intermediate a pair of snapping fingers and having spaced tabs with downwardly sloping facing edges. The alignment structure helps position and hold the motor on the mounting bracket. The snapping fingers engage a lip of the mirror motor.

20 Claims, 2 Drawing Sheets

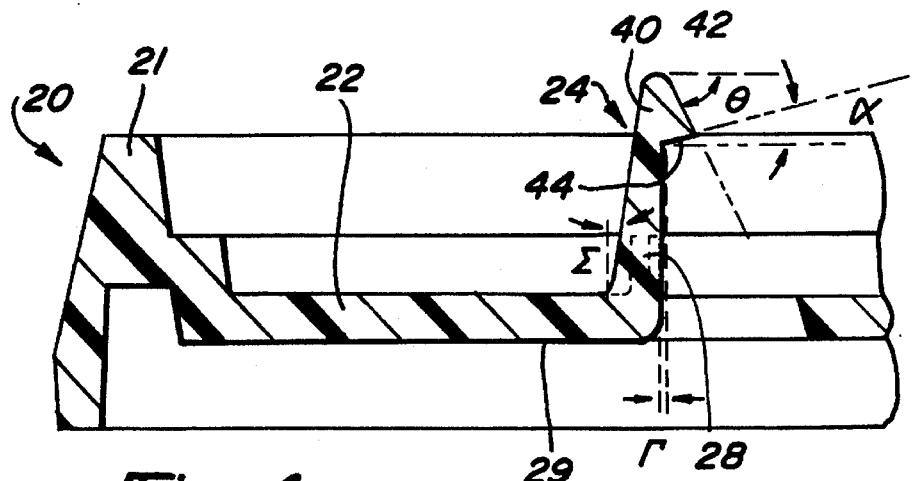
_Fig-4_
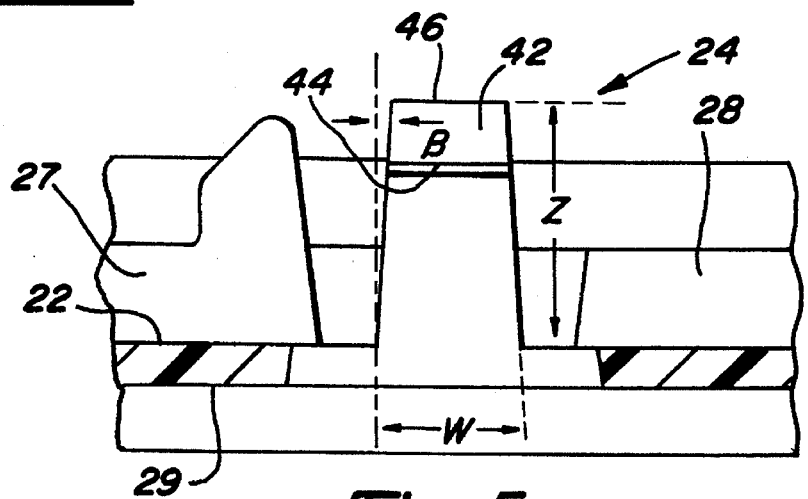
_Fig-5_
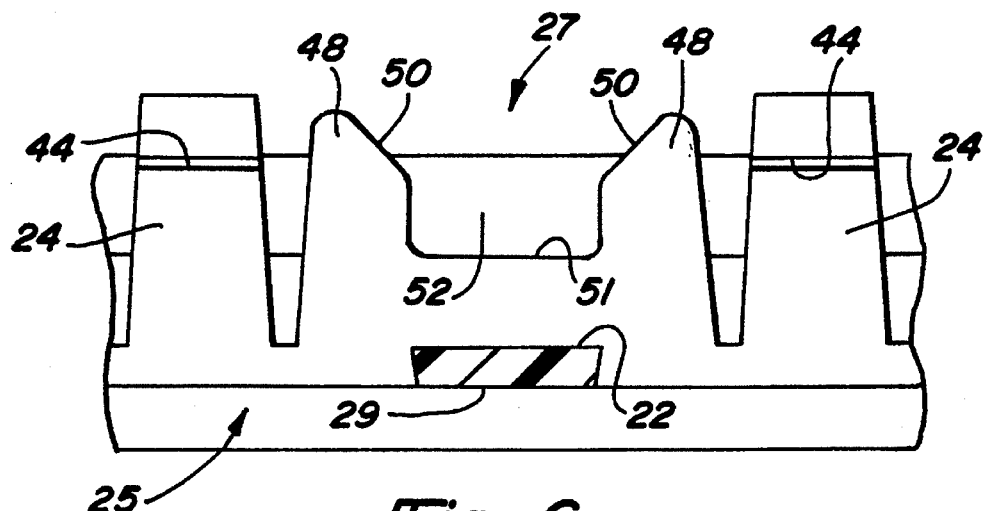
_Fig-6_

MIRROR MOTOR MOUNTING BRACKET

BACKGROUND OF THE INVENTION

The present invention relates to a mounting bracket for a mirror motor designed such that the mirror motor can be snapped in and out of the mounting bracket a plurality of times. Thus, the mirror motor can be serviced or replaced without damaging the mirror motor or mounting bracket.

Motorized adjustable rearview mirrors have become very popular in the automotive industry. In general, mounting brackets mount a mirror on one face and an electric powered mirror motor which moves the mounting bracket and mirror on a second face. The only mount structure holding the mirror is the mounting bracket connection on the mirror motor. The mirror motor must be able to easily move the mirror for adjustment, and thus a fixed connection between the mirror and the housing is typically not provided. As can be appreciated, a mirror extending laterally outwardly of the side of the vehicle is cantilever supported from the vehicle body, and subject to a good deal of vibration.

To withstand vibration, the prior art has typically utilized a stiff snapping finger to lock the motor to the mounting bracket. In such assemblies, if the mirror motor broke, the bracket could not be easily removed from the motor without breaking the snapping fingers. Thus the mirror mounting bracket and motor would all have to be replaced.

In one prior art example, a mounting bracket includes a ring integrally connecting wide snapping fingers. The fingers include a flange which engages with the mating lip of the casing of the mirror motor. Because the fingers are wide and integral with the ring of the mounting bracket, the fingers are too stiff to allow easy disengagement of the motor from the mounting bracket.

Further, in the prior art, the proper location of the motor on the mirror bracket has sometimes been somewhat difficult to achieve. It is necessary that the mirror motor be accurately positioned relative to the bracket, such that the control for mirror motor will send signals that are properly spatially accurate relative to the actual position of the mirror.

In the basic field of locking or snapping tabs, it has been proposed to utilize a top face and a lower face on a tab which is to releasably snap into a second member to hold the second member. In this basic prior art, it has been generally realized that utilizing a steeper angle for the top face than is used for the lower face will allow the member to be releasably snapped by the locking tabs. However, the prior art has not proposed any such structure for locking tabs utilized to hold a mirror mount. A worker of ordinary skill in the art would have believed that such a combination would be unable to withstand the strong vibrational forces that must be overcome by any mirror motor mount. In fact, the prior art locking tabs have utilized a lower face which is extended parallel to the face of the bracket to provide a secure mount to the motor.

SUMMARY OF THE INVENTION

In a disclosed embodiment of this invention, a mounting bracket for a rearview mirror motor includes a plurality of elongate snapping fingers which extend from one face of the mounting bracket. The snapping fingers are disposed at spaced locations around an axis of the mounting bracket. The mounting bracket also includes a plurality of arcuate support members which provide rigidity. The arcuate support members are circumferentially spaced around the axis, and between the snapping fingers. Preferably, the arcuate support members are spaced from the snapping fingers. The snapping fingers releasably engage a mating lip disposed about the periphery of a mirror motor casing. The freestanding elongate snapping fingers flex to snap over the mating lip of the mirror motor casing. The snapping fingers also flex away from the mirror motor, thereby allowing the mirror motor to be detached from the mounting bracket for servicing or replacement.

In a preferred feature of the present invention, the snapping fingers are relatively thin and tall. Preferably, the ratio of the height to circumferential width is at least about 1.5:1. The ratio of height to radial thickness is preferably more than 4:1. The same ratio applies for the height to the nominal thickness of the bracket. Preferably, the circumferential width of the snapping fingers symmetrically tapers at an angle of less than 5°, and preferably 2°. The above ratio holds for the widest portion of the snapping fingers. The snapping finger design provides sufficient flexure in the snapping members to allow the mirror motor to be easily snapped in and out of the mounting bracket several times.

In another preferred feature, the snapping fingers include a head portion having a top face and a bottom face. The top face slopes downwardly at a steep angle and the bottom face slopes upwardly at an angle of at least 10°. The upward slope is preferably much greater than the downward slope. The steep slope on the top face allows the mating lip of the mirror motor casing to be easily snapped into the mounting bracket. The gradual slope on the bottom face provides a buttressing force against the mating lip, thereby maintaining the motor in a mounting position. The mirror motor, however, may easily be detached from the mounting bracket without damaging the mounting bracket or mirror motor.

In another preferred feature, the mounting bracket includes at least one alignment structure intermediate a pair of snapping members and having spaced tabs with downwardly sloping facing edges. The alignment structure guides a portion of the mirror motor onto the mounting bracket and properly positions the mirror motor and bracket.

The location of the alignment structure and its support base, intermediate to closely spaced snapping fingers, provides additional support securely holding the motor on the mounting bracket. Thus, the use of the angle on the lower face is provided with additional support when mounting the motor by the support base intermediate each of the two snapping fingers in each snapping finger pair. Moreover, this close arrangement of additional support surface also allows the use of the relatively tall, thin snapping fingers to facilitate release of the mounting bracket from the motor.

These and other features of the present invention will be best understood from the following specification and drawings, of which the following is a brief description.

BRIEF DESCRIPTION OF THE DRAWINGS

FIG. 4 is cross-sectional view of the mounting bracket along line 4—4 as shown in FIG. 3;

FIG. 5 is a cross-sectional view of the mounting bracket along line 5—5 as shown in FIG. 3; and FIG. 6 is a cross-sectional view of the mounting bracket along line 6—6 as shown in FIG. 3.

DETAILED DESCRIPTION OF A PREFERRED EMBODIMENT OF THE INVENTION

Figure 1:
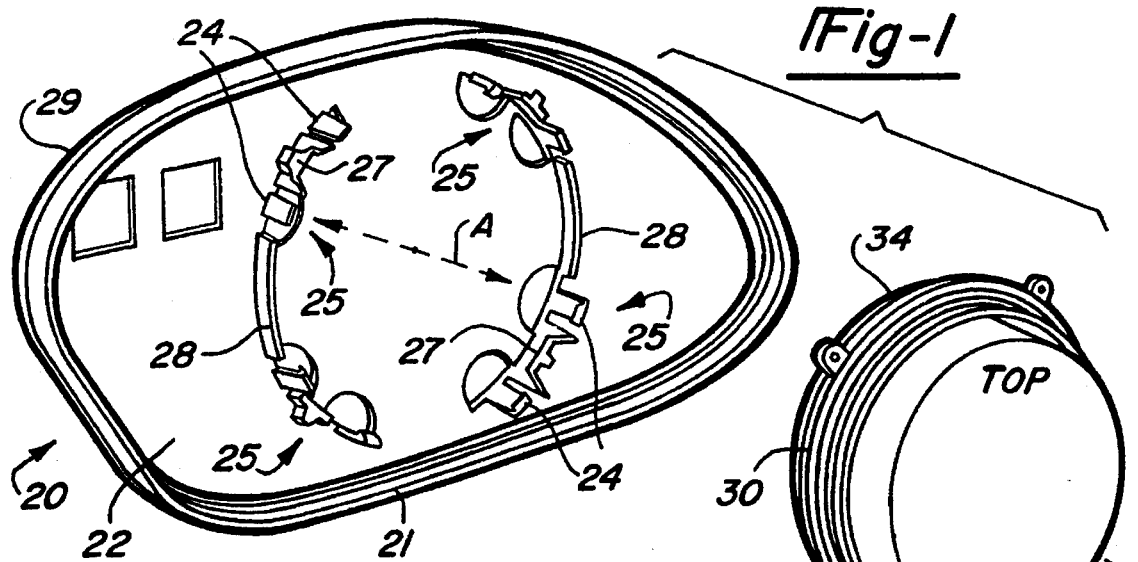
FIG. 1 is a perspective view of a mirror motor mounting bracket and mirror motor in accordance with the present invention.

As shown in FIG. 1, a mounting bracket 20 of the present invention has a planar face 22 from which a plurality of elongate snapping fingers 24 extend. Snapping fingers 24 engage and mount a mirror motor 26 in a releasable fashion, as described further below. Mounting bracket 20 also includes arcuate support members 28 which are disposed circumferentially around an axis A. The snapping fingers 24 are arranged in four sets of adjacent pairs 25, and the arcuate support members 28 extend between two of the pairs. However, the arcuate support members do not extend to be connected with the snapping fingers 24. Arcuate support members 28 provide rigidity to mounting bracket 20. Alignment structure 27 is also disposed on face 22 of mounting bracket 20, intermediate the snapping fingers 24 in each pair 25. Alignment structure 27 aids in positioning mirror motor 26 on mounting bracket 20 in a desired orientation, as described further below. Mounting bracket 20 also has an opposed face 29 which receives a mirror (not shown). Mirror motor 26 has a casing which includes a mating lip 30 and a plurality of guiding ears 32 disposed peripherally on the casing of mirror motor 26. When fully assembled, mirror motor 26 is disposed in a mirror housing with a mirror exposed to an operator of a vehicle. The motor adjusts the orientation of the bracket, and thus the mirror.

Figure 2:
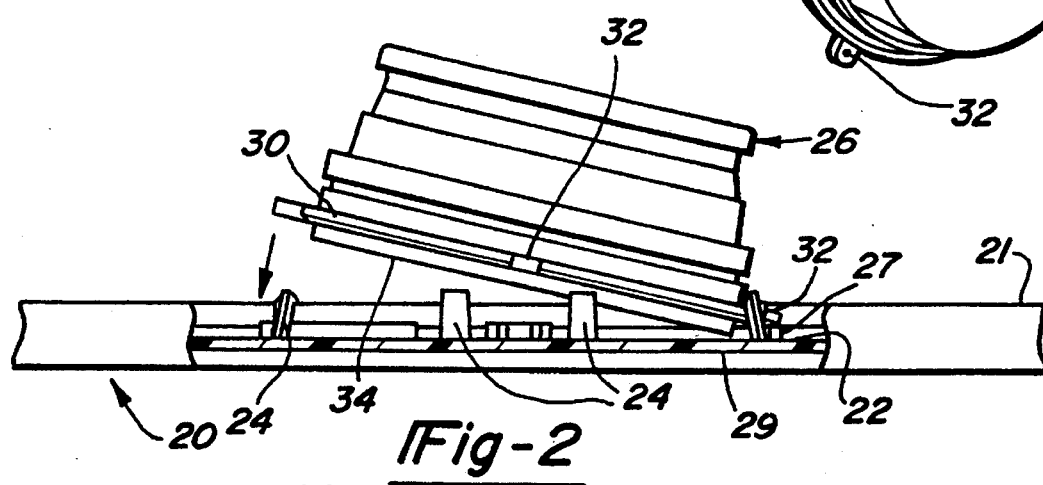
FIG. 2 is a side elevation view of the mounting bracket and mirror motor of FIG. 1.

As shown in FIG. 2, mirror motor 26 is releasably fixed to mounting bracket 20 by having snapping members 24 snap over mating lip 30 of mirror motor 26. A front face 34 of mirror motor 26 abuts face 22 of mounting bracket 20. Ears 32 are received in alignment structure 27 to position mirror motor 26 in a desired orientation for engagement of mating lip 30 with snapping fingers 24. Mirror motor 26 can be selectively disengaged from mounting bracket 20 by applying a pulling force on mirror motor 26 until mating lip 30 snaps out of snapping fingers 24. Mirror motor 26 can be releasably affixed, disengaged and reaffixed to mounting bracket 20 a plurality of times, thus, without damaging mirror motor 26 or mounting bracket 20. Mirror motor 26 can be repaired or replaced and reaffixed to mounting bracket 20 quickly and easily.

Figure 3:
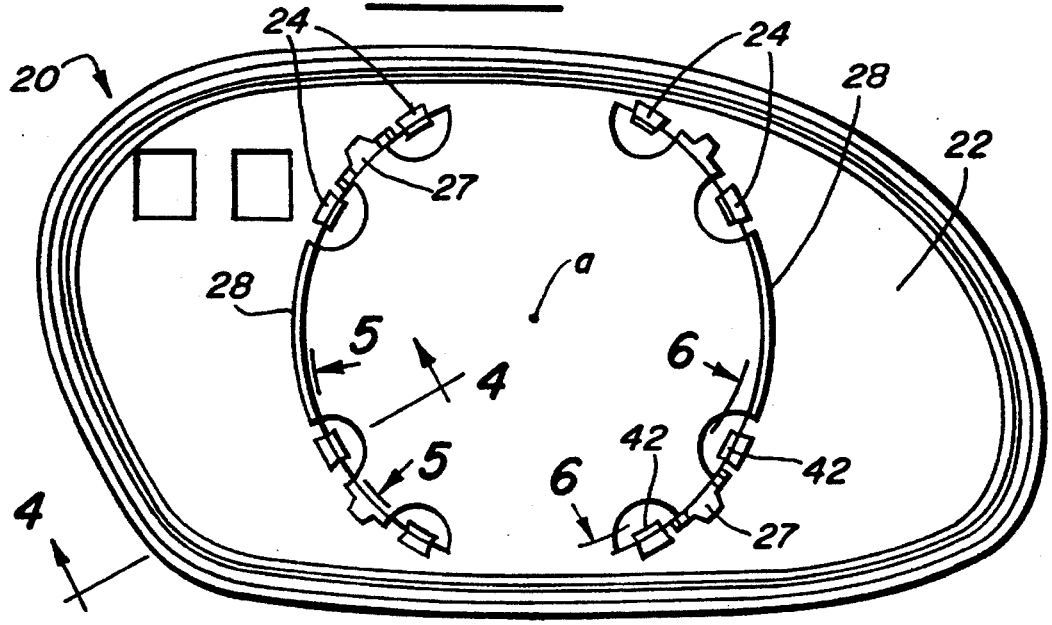
FIG. 3 is a plan view of the mounting bracket of FIG. 1.

As shown in FIG. 3, snapping fingers 24 are disposed at circumferentially spaced locations around a horizontal axis which intersects a plane defined by face 22 of mounting bracket 20 at point a. Alignment structures 27 are also disposed around the axis, and between the snapping fingers 24 in each pair 25. Arcuate support members 27 are also disposed circumferentially around the axis and between the pairs 25 of snapping members 24. Arcuate support members 28 are spaced from snapping fingers 24 so that snapping members 24 can flex more easily during engagement or disengagement with mating lip 30 of mirror motor 26.

As shown in FIG. 4, snapping finger 24 has a head portion 40 which engages with mating lip 30 of mirror motor 26. During engagement between mating lip 30 of mirror motor 26 with snapping finger 24, mating lip 30 will come in contact with upper face 42. A force is applied to mirror motor 26 to engage mirror motor mating lip 30 with snapping fingers 24. Snapping fingers 24 flex away from mating lip 30 (to the left in this figure.) until mating lip 30 passes the vertex between upper face 42 and lower face 44 of head portion 40 of snapping finger 24. Upper face 42 has a steep slope to allow mating lip 30 to easily slide down upper face 42. After snapping fingers 24 snap over mating lip 30 of mirror motor 26, mating lip 30 abuts lower face 44 and front face 34 of mirror motor 26 abuts face 22. Lower face 44 has a gradual slope to retain mirror motor 26 in mounting bracket 20, acting as a partial buttress. During disengagement of mirror motor 26 from mounting bracket 20, a pulling force on mirror motor 26 (generally upward in this figure) will drive mating lip 30 along lower face 44, thereby forcing snapping finger 24 to flex away from mating lip 30 until the lip passes the vertex between upper face 42 and lower face 44. Mirror motor 26 will then disengage from snapping fingers 24 and, thus, mounting bracket 20.

Upper face 42 is sloped downwardly at an angle $\Theta$ from a plane parallel to face 22, where $\Theta$ is at least about 45°, preferably at least about 60°. Most preferably, $\Theta$ is about 65°. Lower face 44 of snapping member 24 is sloped upwardly at an angle $\alpha$ from a plane parallel to face 22, where $\alpha$ is preferably at least about 10°, most preferably between about 10° and about 20°. In one embodiment $\alpha$ is about 15°. Preferably $\Theta$ is greater than $\beta$.

In a preferred embodiment, an inner face of snapping fingers 24 extend from face 22 of mounting bracket 20 at an angle $\Gamma$ from a plane perpendicular to face 22 where $\Gamma$ is preferably from about 1° to about 2° and most preferably 1.5°. An outer face of snapping member 24 is also angled inwardly. The outer face of snapping fingers 24 extend from face 22 of mounting bracket 20 at an angle $\Sigma$ from a plane perpendicular to face 22, where $\Sigma$ is preferably from about 5° to about 10° and most preferably 8°. Preferably angle $\Gamma$ is greater than angle $\Sigma$ such that the radial width of snapping members 24 tapers from face 22 to head portion 42. The sloping of inner and outer faces of snapping fingers 24 provides additional flexure to snapping members 24 and helps retain mirror motor 26 in a mounting position on mounting bracket 20.

As shown in FIG. 5, the circumferential width of snapping member 24 symmetrically tapers from face 22 to head portion 42 at an angle $\beta$, where $\beta$ is preferably less than 5°, and most preferably 2°. Snapping fingers 24 have a ratio of height, Z, to circumferential width w of at least about 1.5:1, with the width being measured at its greatest extent. Height Z is measured from opposed face 22 to apex 46. As shown, alignment structure 27 and arcuate support members 28 are preferably spaced from snapping finger 24.

In addition, the ratio of the height of the snapping fingers 24 relative to both the thickness of the base 22, and also the radial thickness of the snapping finger 24, are both selected to be greater than 4:1. The head portion 40 of the snapping fingers 24 preferably accounts for 25–50% of the total height of the snapping finger. More preferably, the head accounts for 30–35% of the total height of the snapping fingers. By providing the head to have such a significant portion of the total height of snapping fingers, it is insured that a good deal of material will be beyond the lip in the motor to provide a secure mount for the motor.

Because snapping members 24 are relatively tall and thin, as described above, mirror motor 26 is easily snapped into mounting bracket 20 and can be disengaged therefrom without much difficulty and without damaging mounting bracket 20 or mirror motor 26. Snapping fingers 24 are flexible, yet durable, and will allow the mirror motor 26 to be attached and detached a number of times. As will be explained below, the motor is also securely mounted.

As shown in FIG. 6, mounting bracket 20 also include alignment structure 27 which aid in positioning and mounting mirror motor 26 on mounting bracket 20. Alignment structure 27 includes spaced tabs 48 having downwardly sloping facing edges 50 which guide ears 32 of mirror motor 26 onto a support base 51. Tabs 48 define a cavity 52 which receives the ears 32 of mirror motor 26 on base 51.

As can be seen in FIGS. 1 and 2, mounting bracket 20 preferably includes four pairs 25 of snapping fingers 24 and four alignment structures 27. Each alignment structure 27 is intermediate the two fingers 24 in each pair 25 and receive an ear 32 of mirror motor 26 on base 51. Each pair 25 of snapping members 24 are disposed at equally spaced annular points around an axis, A, at a point, a, of mounting bracket 20. Mounting bracket 20 also includes two arc support members 28 disposed at opposed points around axis A, each arc member 28 intermediate two pairs of snapping members 24.

Since the alignment structure and its support base 51 is positioned between two circumferentially, closely-spaced snapping fingers 24, the support base 51 is able to provide additional support surface pushing upwardly against the bottom face 44 of head portion 40. This insures a more secure mount to resist the vibration that will be encountered in operation. Moreover, the relatively great amount of height provided by the head relative to the tall entire snapping finger also provides sufficient material outwardly of the lip of the motor to insure that the motor will be properly mounted on the mounting bracket.

A preferred description of this invention has been disclosed; however, a worker of ordinary skill in the art would recognize that certain modifications would come within the scope of this invention. For that reason, the following claims should be studied in order to determine the true scope and content of this invention.

I claim:

1. A mounting bracket for a mirror motor comprising:
   a bracket body having a planar portion defining a bracket face, a plurality of elongate snapping fingers extending from said face and disposed at circumferentially spaced locations around an axis extending perpendicular to said bracket face;
   a plurality of arcuate support members extending from said face, and disposed circumferentially around said axis and between said snapping fingers; and
   said plurality of elongate snapping fingers each having a height measured away from said bracket face and a circumferential width, wherein the ratio of said height to said width is at least about 1.5:1, and wherein said plurality of arcuate support members are spaced from said plurality of snapping fingers by slots extending to said planar portion.

2. The mounting bracket as recited in claim 1, wherein said circumferential width of said snapping fingers symmetrically tapers from a base adjacent said bracket face to a head portion at an angle of less than about 5°.

3. The mounting bracket as recited in claim 1, wherein each of said plurality of snapping fingers include a head portion having a top face and a bottom face, said top face sloping downwardly at a first angle relative to a plane which is parallel to the plane of said bracket face, said bottom face sloping upwardly at a second angle of at least about 10° from a plane which is parallel to the plane of said bracket face, wherein said first angle is larger than said second angle.

4. The mounting bracket as recited in claim 3, wherein the height of said head portion is between 25–50% of the total height of said snapping fingers.

5. The mounting bracket as recited in claim 4, wherein the height of said head portion is between 30–35% of the total height of said snapping fingers.

6. The mounting bracket as recited in claim 1, wherein said snapping fingers are arranged in pairs of relatively adjacent snapping fingers spaced further from other pairs of snapping fingers, with alignment structures disposed intermediate said snapping fingers in at least some of said pairs.

7. The mounting bracket as recited in claim 6, wherein said alignment structures are spaced from said plurality of snapping fingers.

8. The mounting bracket of claim 6, wherein said alignment structures comprise two circumferentially spaced tabs with downwardly sloping facing edges for guiding corresponding structure on a motor between said tabs and onto a support surface which extends upwardly from said bracket face.

9. A mounting bracket as recited in claim 1, wherein both said arcuate support members and said snapping fingers extend from said planar portion for a distance defined as a height, said height of said snapping fingers being greater than said height of said arcuate support members.

10. A mounting bracket for a mirror motor comprising:
    a bracket body having a planar portion defining a planar face, a plurality of elongate snapping fingers extending from said planar face and disposed at circumferentially spaced locations around an axis extending perpendicular to said planar face, each of said plurality of snapping fingers including a head portion at an end spaced from said planar face, said head portion having a top face facing away from said planar face and a bottom face facing said planar face; and
    a plurality of arcuate support members extending from said planar face and circumferentially around said axis, said plurality of arcuate support members being spaced from said plurality of snapping fingers adjacent said planar face and both said arcuate support members and said snapping fingers extending from said planar portion for a distance defined as a height, said height of said snapping fingers being greater than said height of said arcuate support members;
    said top face sloping downwardly at a first angle measured from a plane parallel to said planar face, said bottom face sloping upwardly at a second angle of at least about 10° from a plane parallel to said planar face; and
    wherein said first angle is greater than said second angle.

11. The mounting bracket as recited in claim 10, wherein said first angle is greater than about 45°.

12. The mounting bracket as recited in claim 10, said plurality of snapping fingers each having a height measured from said planar face and a circumferential width, wherein the ratio of said height to said width is at least about 1.5:1.

13. The mounting bracket as recited in claim 12, wherein the height of said head portion is between 25–50% of the total height of said snapping fingers.

14. The mounting bracket as recited in claim 13, wherein the height of said head portion is between 30–35% of the total height of said snapping fingers.

15. The mounting bracket as recited in claim 10, wherein said snapping fingers are arranged in pairs of relatively adjacent snapping fingers spaced further from other pairs of snapping fingers, with alignment structures disposed intermediate said snapping fingers in at least some of said pairs.

16. The mounting bracket of claim 15, wherein said alignment structures comprise two circumferentially spaced tabs with downwardly sloping facing edges for guiding corresponding structure on a motor between said tabs and onto a support surface which extends upwardly from said bracket face.

17. A mirror assembly comprising:

A mounting bracket having a planar portion defining a planar face, a plurality of elongate snapping fingers extending from said planar face and disposed at circumferentially spaced locations around an axis extending perpendicular to said planar face, at least one arcuate support member extending from said planar face and disposed circumferentially around said axis and between said snapping fingers, and at least one alignment structure intermediate a pair of said plurality of snapping fingers and having circumferentially spaced tabs with downwardly sloping facing edges and a support surface between said tabs and extending upwardly from said face, wherein said arcuate support member is spaced from said snapping fingers by a slot extending to said planar portion;

a mirror motor including a casing, a mating lip disposed around a periphery of said casing and at least one ear at said periphery of said casing;

said plurality of snapping fingers releasably engaging said mating lip for mounting said motor on said bracket said, tabs guiding said ear onto said support surface as said motor is mounted on said bracket, to thereby aid in positioning and holding said motor on said bracket as said motor is mounted on said bracket.

18. A mirror assembly as recited in claim 17, wherein said snapping fingers are mounted in circumferentially spaced pairs of two snapping fingers each, each of said pairs being spaced by a relatively greater circumferential extent relative to the circumferential spacing between the two snapping fingers in each said pair, and said alignment structure being mounted intermediate said two snapping fingers in each said pair.

19. A mirror assembly as recited in claim 18, wherein there are a plurality of pairs of said snapping fingers, a plurality of said alignment structures, and a plurality of said ears, with each of said ears being received within one of said alignment structures, and each of said alignment structures being formed intermediate the two snapping fingers in each of said pairs.

20. A mounting bracket as recited in claim 17, wherein both said arcuate support members and said snapping fingers extend from said planar portion for a distance defined as a height, said height of said snapping fingers being greater than said height of said arcuate support members.

* * * * *